April 7, 1936.  R. M. McCREADY  2,036,765
ATTACHMENT FOR PLANTING MACHINES
Filed June 26, 1935
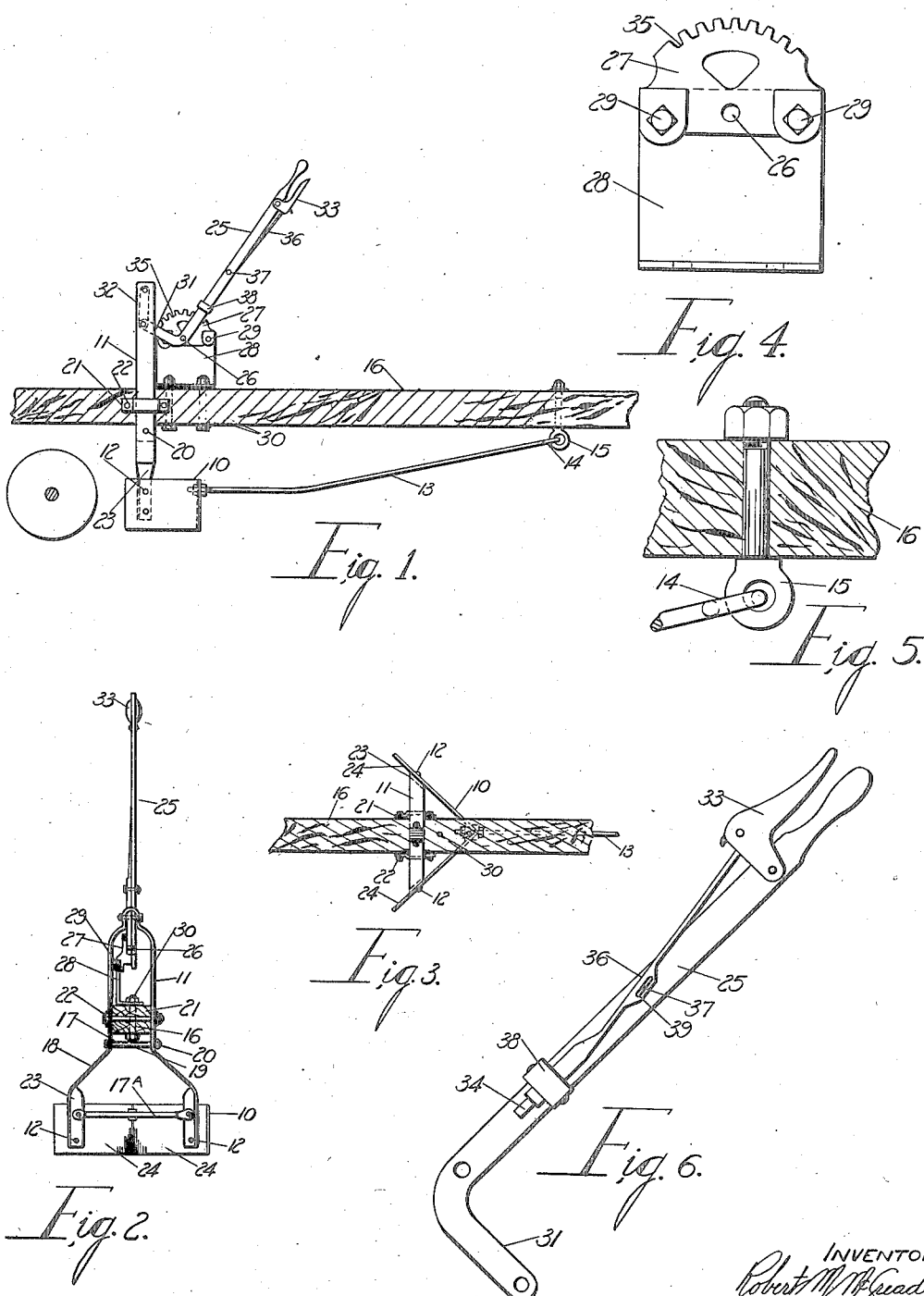

Patented Apr. 7, 1936

2,036,765

UNITED STATES PATENT OFFICE 2,036,765

ATTACHMENT FOR PLANTING MACHINES

Robert Maxwell McCready, Scotland, Ontario, Canada

Application June 26, 1935, Serial No. 28,443
In Canada April 11, 1935

2 Claims. (Cl. 97—225)

The invention relates to improvements in planting machines, as described in the present specification and illustrated in the accompanying drawing which forms a part of the same.

The invention consists essentially of a readily adjustable earth working implement as pointed out broadly and specifically in the claims for novelty following a description in detail of an acceptable form of the invention.

The objects of the invention are to construct an attachment for tobacco transplanting machines and the like that will remove the dry earth lumps and crust leaving the ground fine and moist prior to planting of the young seedlings producing thereby a fine moist seed bed so important to the young plant until the roots descend and fix themselves in the earth, to provide a device which will eradicate weeds, uproot old stocks and stubble, the presence of which would smother out the young plants if allowed to remain; to devise a device the use of which will assure the planter of the maximum amount of protection and reduce to a minimum the danger of plant loss; to eliminate the necessity of replanting any portion of the crop thereby producing a uniform yield and harvesting, procuring for the planter the highest grading and price possible; and generally to provide a simple attachment of comparatively simple parts, reasonable in cost of production, installation and repairs, without affecting the durable and efficient properties for the purpose set forth.

In the drawing, Figure 1 is a side elevational view showing the invention attached to the tongue of a transplanting machine.

Figure 2 is an end elevation showing the attachments of the invention.

Figure 3 is a plan view of the invention.

Figure 4 is a side elevational view of the operating lever quadrant and supporting bracket.

Figure 5 is a detail of the thrust rod pivot connecting means.

Figure 6 is a detail of the operating lever, pawl and connecting bar.

Like numerals of reference indicate corresponding parts in the various figures.

Referring to the drawing, the V-shaped earth working implement 10 is adjustably supported by the movable bridle 11 rigidly secured thereto by the rivets 12 or other suitable means, and this V-shaped implement 10, or scraper as commonly termed, has the longitudinal thrust rod 13 rigidly secured thereto leading therefrom terminating in the eye 14 adapted to operatively engage the eyebolt 15 secured in the transplanting machine tongue 16.

The V-shaped implement or scraper 10 is preferably formed of plate, and has the cross brace or lateral thrust rod 17A to prevent buckling should the scraper strike a stone or other obstacle, and may be secured to the scraper 10 by the bridle fastening means 12 or otherwise as desired.

The bridle 11 which is preferably formed of flat iron, is flared out at 18 at a point directly below the tongue 16 and the spreader 17. The spreader 17 is suitably formed of the pipe ferrule 19 and the bolt 20, the ferrule 19 being of a length suitable to permit of raising and lowering of the bridle 11 without its binding against the sides of the tongue 16, and the guide brackets 21 which are mounted thereover and secured to the tongue by the bolts 22. The flared ends 18 of the bridle 11 are bevelled at 23 to suitably engage the inner surface of the scraper walls 24.

The scraper 10 and the bridle 11 are adapted to move upwardly and downwardly according to the depth of the cut required, and this movement is controlled by the depth adjusting lever 25 pivotally mounted on the fulcrum pin 26 secured in the quadrant 27 which is mounted on the supporting bracket 28 and rigidly held thereto by the bolts 29, the bracket 28 being mounted on the tongue 16 and held thereto by the bolts 30, the curved end 31 of the depth adjusting lever 25 and the bridle 11 being operatively connected together by the connecting link 32.

The depth adjusting lever 25 has the handle lever 33 pivotally attached thereto for engaging and disengaging the pawl 34 with the notches 35 formed in the radial upper surface of the quadrant 27, and this pawl 34 is movably connected to the handle lever 33 by the bar 36, which is suitably supported on and guided by the pin 37 and the guide strap 38, the bar 36 being suitably slotted at 39 to permit shifting and locking of the depth adjusting lever 25 in any desired angular position.

In the operation of the invention, the scraper is installed on the transplanting machine in front of the earth roller which is a standard attachment on planters.

Unlike other farm crops, tobacco requires much devotion at first to get the crop started; the land must be ploughed deep, and fertilized. Fertilizer must be sown in ridges, after the fertilizer is sown, the land cannot be worked again until after planting. These ridges must stand at least a week, and often as long as a month before plants are put in. A week must elapse to avoid burning of plants by fertilizer.

In the course of fertilizing the earth, ridges are left by the implement which dry out and form a crust and weed seeds sprout and grow very rapidly in the fertilized soil which if allowed to remain, would rob the young seedlings of moisture and smother them out.

The scraper removes dry surface of ridges produced by the fertilizing implement, and eradicates the weeds, leaving a clean, moist, fine bed, in which sufficient moisture is prevalent to enable the plant to withstand drought, and rapidly adapt itself thereto, thereby increasing the number of live plants which if otherwise had been planted in the dry earth crust, would have succumbed to the warmth of the sun.

Replanting of portions of the crop is therefore eliminated, which assures the planter of a uniform crop which will ripen evenly, producing a higher quality and flavor which is the most important factor of good tobacco.

Should replanting be necessary, the plants which are set in, will be at least two weeks longer than original plants in maturing.

It is of course understood that various modifications may be made to the device, and that the same is adaptable for installation on strawberry transplanting machines and the like as well, without in any way departing from the essential features of the invention.

What I claim is:

1. An attachment for planting machines comprising an angular shaped scraper situated beneath a projecting tongue of the planting machine and having a lateral thrust rod connecting the scraper side walls together and a horizontal thrust rod secured to the end of the scraper and to said tongue, a bridle having flaring ends secured to the side walls of said scraper and adjustably mounted on said projecting tongue, and means for moving said bridle upwardly and downwardly.

2. An attachment for planting machines comprising an angular shaped scraper situated beneath a projecting tongue of the planting machine and having a horizontal thrust rod secured to the juncture of the two walls of said scraper and to said tongue respectively, a bridle having flaring ends secured to the side walls of said scraper, a lateral thrust rod secured to said flaring ends of the bridle, a spreader secured to the bridle above the flaring ends, guide brackets engaging said bridle and secured to said tongue, and means for moving said bridle upwardly and downwardly and retaining it in the desired position.

ROBERT MAXWELL McCREADY.